US012805430B2

(12) United States Patent
Fay, II et al.

(10) Patent No.: US 12,805,430 B2
(45) Date of Patent: Nov. 24, 2026

(54) HYDRAULIC AUGER DRIVE USING CUTTER BAR TO DRIVE HYDRAULIC PUMP

(71) Applicant: CNH Industrial America LLC, New Holland, PA (US)

(72) Inventors: Jeffrey Fay, II, Oxford, PA (US); Kevin Richman, Plainfield, IL (US); Jeremy Thorpe, Bear River City, UT (US); Glenn Bird, Ephrata, PA (US); Brian Spencer, Mount Pleasant, WI (US)

(73) Assignee: CNH Industrial America LLC, New Holland, PA (US)

( * ) Notice: Subject to any disclaimer, the term of this patent is extended or adjusted under 35 U.S.C. 154(b) by 344 days.

(21) Appl. No.: 18/397,215

(22) Filed: Dec. 27, 2023

(65) Prior Publication Data

US 2025/0212719 A1 Jul. 3, 2025

(51) Int. Cl.
*A01D 34/03* (2006.01)
*A01D 41/06* (2006.01)
*A01D 61/04* (2006.01)

(52) U.S. Cl.
CPC ............. *A01D 34/03* (2013.01); *A01D 41/06* (2013.01); *A01D 61/04* (2013.01)

(58) Field of Classification Search
CPC ........ A01D 34/03; A01D 41/06; A01D 61/04; A01D 34/76
USPC ............................................................ 56/229
See application file for complete search history.

(56) References Cited

U.S. PATENT DOCUMENTS

| | | | | |
|---|---|---|---|---|
| 4,009,556 | A | 3/1977 | Molzahn | |
| 10,791,673 | B2 | 10/2020 | Schmoening et al. | |
| 10,820,509 | B2 * | 11/2020 | Schroeder | A01D 61/004 |
| 11,425,860 | B2 | 8/2022 | Noll | |
| 2012/0031064 | A1 * | 2/2012 | Barnett | A01D 34/76 56/157 |
| 2016/0029560 | A1 * | 2/2016 | Jespersen | A01D 57/30 56/189 |
| 2016/0374265 | A1 * | 12/2016 | Borry | A01D 57/02 56/296 |
| 2017/0150678 | A1 * | 6/2017 | Li | A01F 12/184 |
| 2019/0045709 | A1 * | 2/2019 | Schroeder | A01D 45/021 |
| 2020/0236853 | A1 * | 7/2020 | Trowbridge | A01D 41/142 |
| 2020/0404843 | A1 * | 12/2020 | Li | A01D 41/1252 |
| 2021/0289696 | A1 * | 9/2021 | Todderud | A01D 34/046 |
| 2023/0136518 | A1 * | 5/2023 | Jadhav | A01D 41/06 56/14.5 |
| 2025/0072331 | A1 * | 3/2025 | Ps | F16H 3/08 |

* cited by examiner

*Primary Examiner* — Mohamed Abdo Algehaim
(74) *Attorney, Agent, or Firm* — CM Law PLLC; Stephen J. Weed

(57) ABSTRACT

An agricultural machine having: a header frame; a crop cutter mounted to the frame; a first transmission operatively connected to the crop cutter and defining a first power flow path to drive the crop cutter by operative motion of a first transmission input; an auger rotatably mounted to the frame to rotate relative to the frame about a rotation axis; and a second transmission operatively connected between the crop cutter and the auger and defining a second power flow path to drive the auger by operative motion of the crop cutter.

20 Claims, 3 Drawing Sheets

HYDRAULIC AUGER DRIVE USING CUTTER BAR TO DRIVE HYDRAULIC PUMP

FIELD OF THE INVENTION

The present invention pertains to an agricultural machine having a header that is configured to cut crop materials.

BACKGROUND OF THE INVENTION

A farmer may use an agricultural mowing device, such as a mower or mower conditioner, to cut crop material like hay or grass and deposit the cut crop material onto the field in windrows or swaths. For cutting smaller fields, a single pull-type mower or mower conditioner may be attached to the rear of an agricultural driving vehicle. For cutting large fields, the driving vehicle may push a front mounted mower or mower conditioner—sometimes referred to as a "header"—and optionally tow an additional rear mounted mower or mower conditioner.

A typical agricultural mowing device generally includes a frame, a hitch or linkage arrangement coupling the header to the vehicle, and a cutter bar such as a sickle bar cutter or rotary disc cutter bar for severing the crop from the field. The mower may further include other elements such as a reel to assist crop feeding, an auger or belts to convey crop to a central discharge point, and a flail or set of rollers for conditioning crop as it is ejected rearwardly out of the mower. A disc cutter bar generally includes multiple juxtaposed cutterheads for cutting the standing crop. Each cutterhead may consist of a rotating disc with diametrically opposed cutting blades or knives affixed to the body of the disc.

BRIEF SUMMARY OF THE INVENTION

In a first exemplary aspect, there is provided an agricultural machine having: a header frame; a crop cutter mounted to the frame; a first transmission operatively connected to the crop cutter and defining a first power flow path to drive the crop cutter by operative motion of a first transmission input; an auger rotatably mounted to the frame to rotate relative to the frame about a rotation axis; and a second transmission operatively connected between the crop cutter and the auger and defining a second power flow path to drive the auger by operative motion of the crop cutter.

In another exemplary aspect, there is provided a method of operating an agricultural machine having a crop cutter and an auger, the method comprising: driving the crop cutter via a first transmission connected to the crop cutter at a first location to operate the crop cutter at a first rotating speed; and driving the auger via a second transmission connected to the crop cutter at a second location to operate the crop cutter at a second rotating speed.

This summary is illustrative only and is not intended to be in any way limiting. Other aspects, inventive features, and advantages of the devices or processes described herein will become apparent in the detailed description set forth herein, taken in conjunction with the accompanying figures.

BRIEF DESCRIPTION OF THE SEVERAL VIEWS OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. The terms "forward," "rearward," "left" and "right," when used in connection with the agricultural mowing device and/or components thereof are usually determined with reference to the direction of forward operative travel of the towing vehicle, but they should not be construed as limiting. The terms "longitudinal" and "transverse" are determined with reference to the fore-and-aft direction and lateral direction, respectively.

Figure 1:
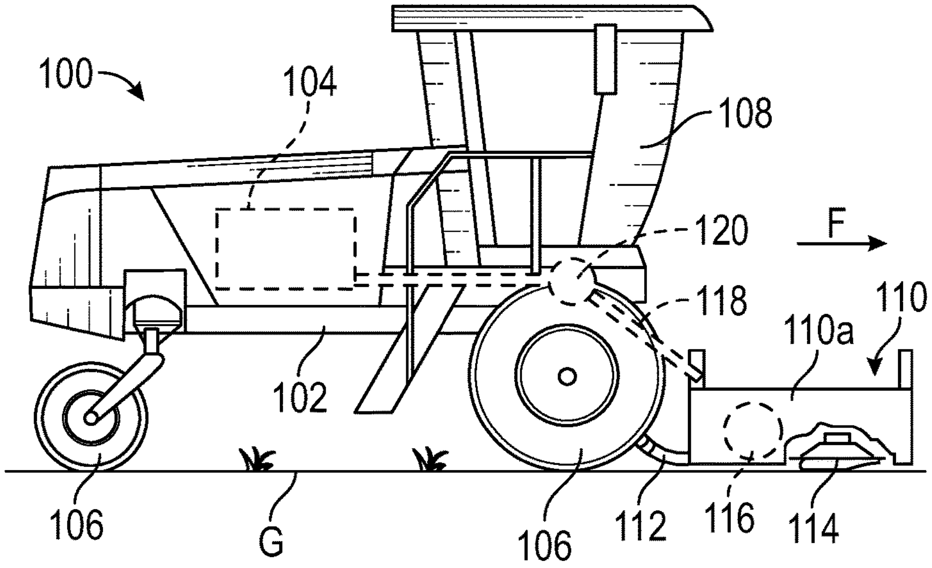
FIG. 1 is a schematic illustration of an agricultural vehicle, according to an exemplary embodiment.

Referring now to the drawings, FIG. 1 shows an example of an agricultural vehicle 100, such as a tractor, having a chassis 102, a main power unit 104 (e.g., diesel engine), wheels 106 to support and drive the vehicle 100 for movement on a ground surface G, and a cab 108 in which the operator sits while operating the vehicle 100. A header 110 is attached to the front of the chassis 102, in relation to a forward operating direction F, by a linkage 112 that allows the header 110 to move relative to the chassis 102. The header 110 may be considered to be part of the vehicle 100, or as a separate add-on device.

The header 110 includes a header frame **110*a* to which are mounted operating parts such as a crop cutter 114 (e.g., a sickle bar cutter or a disc cutter) that is configured to sever crops from the ground, and an auger 116 that is configured to direct the severed crop material towards a lateral centerline of the vehicle 100 to be deposited in a windrow and/or further processed. Non-limiting examples of a sickle cutter and an auger are shown in U.S. Pat. No. 10,624,259, and non-limiting examples of a disc cutter and an auger are shown in U.S. Pat. Nos. 7,730,703 and 5,996,323. The foregoing references, and any others identified herein, are incorporated by reference herein. The crop cutter 114 and auger 116 are powered by a power take off shaft 118, which may be operatively connected to the main power unit 104 by a clutch and/or geared transmission 120 located on the chassis 102**. Except as explained herein, these and other features of an agricultural vehicle are generally known and need not be described in further detail herein.

Figure 2:
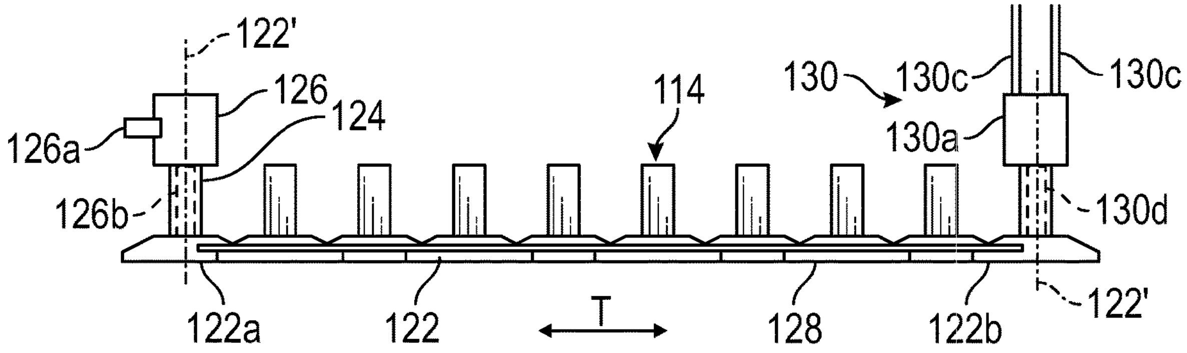
FIG. 2 is a schematic illustration of a rotary disc cutter arrangement, as may be used according to an exemplary embodiment.

FIG. 2 shows the exemplary crop cutter 114 schematically in a front view (i.e., looking towards the header 110 opposite the forward direction F). The crop cutter 114 is shown as a disc cutter having a plurality of cutting discs 122 arranged in a row along a transverse axis T that is perpendicular to the fore-aft axis defined by the forward direction F. Each cutting disc 122 is mounted on a support 124 to rotate about a respective rotation axis 122'. The respective rotation axes 122' may be parallel to each other, but this is not required. It will be understood that FIG. 2 could be considered to schematically illustrate one or more sickle bar cutters which, while different in structure, need not be shown by a different schematic illustration to effectuate the purposes of this disclosure. Mechanical structures of cutting discs 122 and sickle bar cutters are known in the art, as evidenced by the afore-mentioned patent references, and need not be described in detail herein.

A first transmission 126 is provided to operate the crop cutter 114. More specifically, the first transmission 126 has a first transmission input 126*a* configured to receive motive power, and a first transmission output 126*b* configured to convert the motive power into a drive force to operate the crop cutter 114. Thus, the first transmission 126 defines a first power flow path to drive the crop cutter 114. In this example, the first transmission 126 comprises an entirely transmission having a mechanical gearbox, with the first transmission input 126*a* being a splined input shaft or the like to connect to the power take off shaft 118, and the first transmission output 126*b* being a drive shaft (e.g., a shaft with universal joints to allow for slight misalignment) that is connected to a first cutting disc 122*a*. In other cases, the first transmission 126 may comprise one or more hydraulic drive members, such as a hydraulic motor or the like.

The first transmission may include any suitable gears or other mechanical force-transfer mechanisms (e.g., bevel gears, ring and pinion gears, reduction or overdrive gears, chains and sprockets, etc.) to convert motion of the first transmission input 126*a* into motion of the first transmission output 126*b*. In some cases, it is expected to be beneficial to configure the first transmission 126 as an overdrive arrangement, in which the output 126*b* operates at a higher speed than the input 126*a*. For example, the first transmission 126 may have an input-to-output drive ratio of between 1:2 and 1:2.4. Such an arrangement can be beneficial in circumstances in which the power take off shaft 118 is not able to rotate at a speed that is sufficient to obtain efficient operation of the crop cutter 114. For example, a typical multi-purpose tractor-type vehicle 100 may operate the power take off shaft at no more than 1000 revolutions per minute ("rpm"), whereas the ideal operating speed for a disc cutter might be 2000 rpm or above. Thus, the first transmission 126 may be configured to provide an overdrive input-to-output ratio of 1:2, 1:2.2, 1:2.4 or the like.

The crop cutter 114 may include an internal drive arrangement 128 (shown schematically) that transmits the driving force from the first transmission 126 to all of the operating parts of the crop cutter 114. For example, where the crop cutter 114 comprises a disc cutter, the cutting discs 122 may be connected by a transfer shaft to transmit the drive force applied directly to the first cutting disc 122*a* through all of the remaining cutting discs 122 in the row. As another example, where the crop cutter 114 is a sickle bar cutter, the internal drive arrangement 128 may comprise a continuous rigid bar that joins the cutting blades together.

Figure 3:
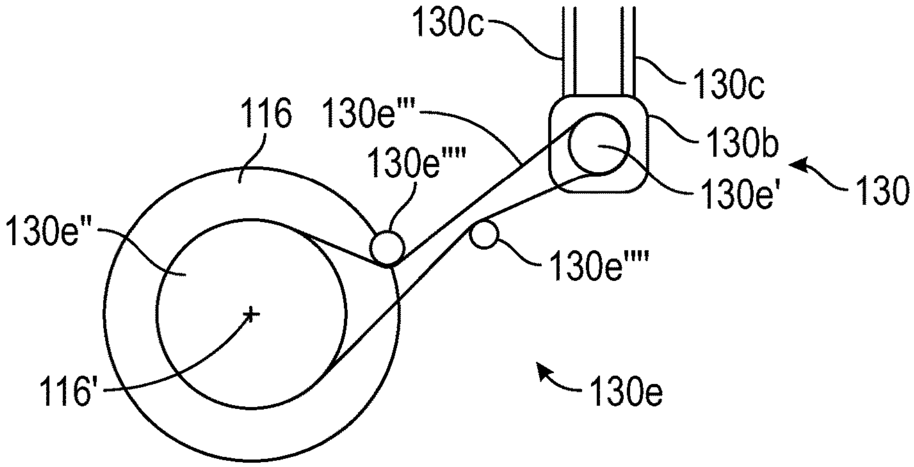
FIG. 3 is a schematic illustration of an auger drive arrangement, as may be used according to an exemplary embodiment.
Figure 4:
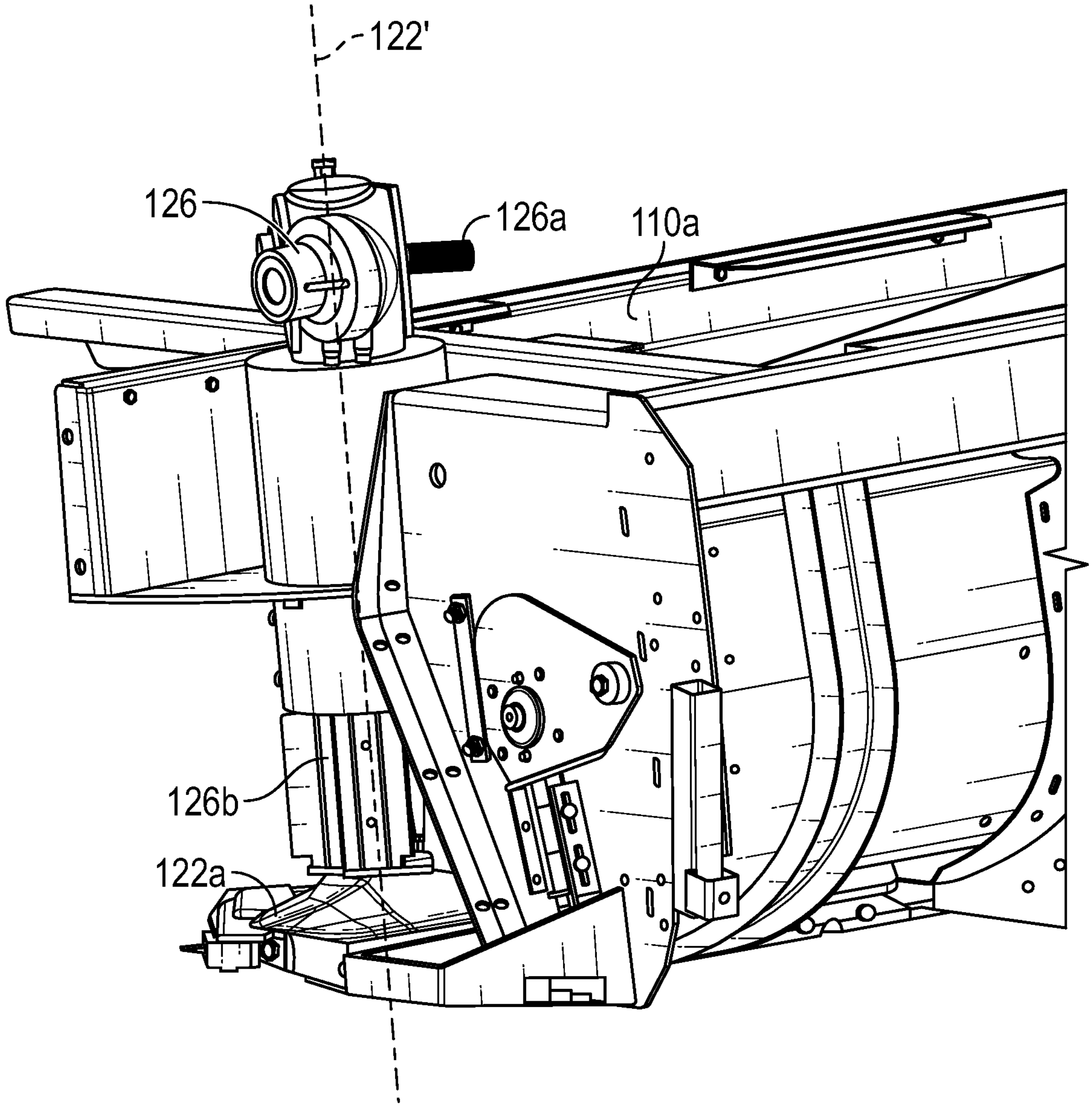
FIG. 4 is an isometric view of an example of a rotary disc cutter drive arrangement, as may be used according to an exemplary embodiment.
Figure 5:
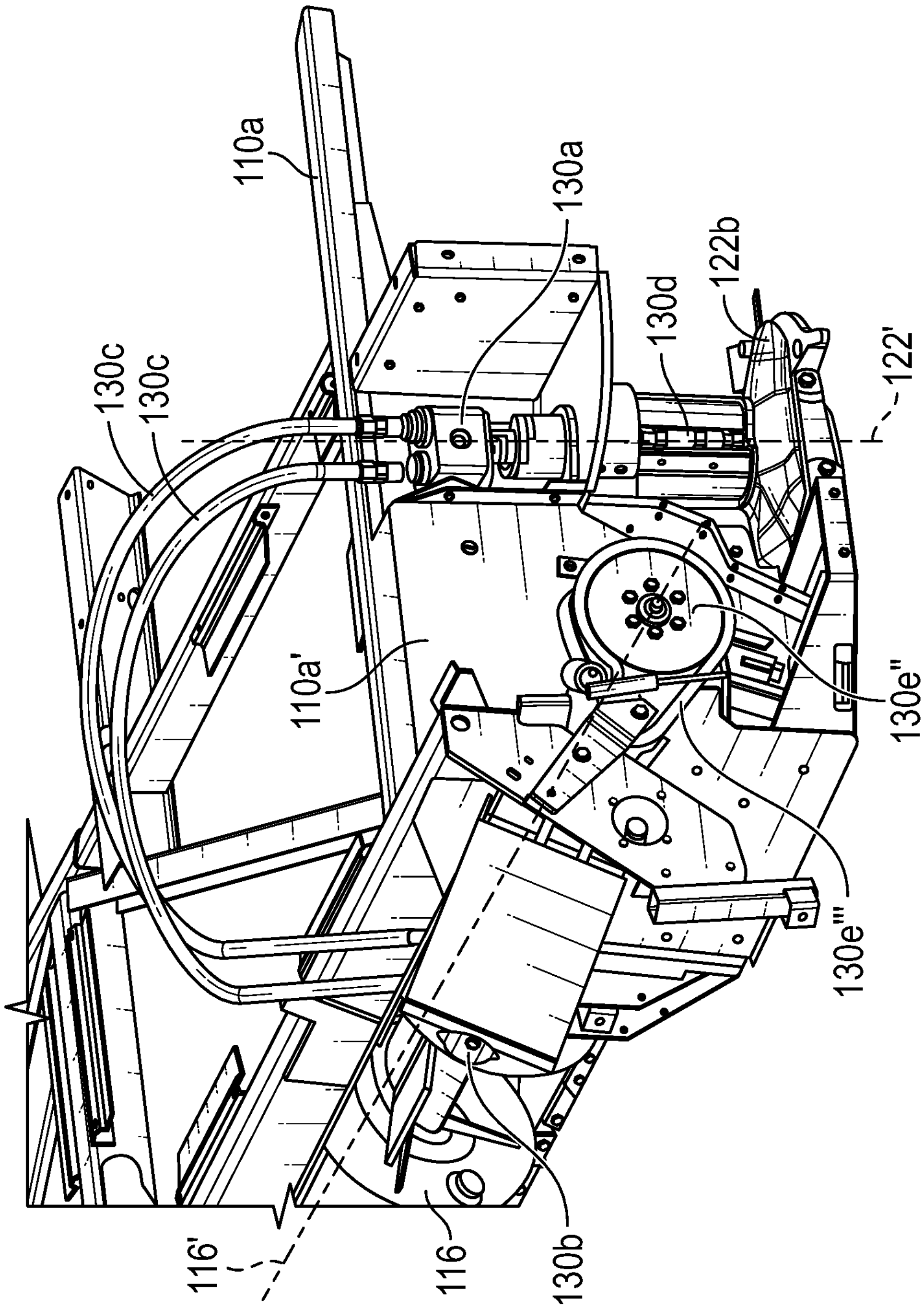
FIG. 5 is an isometric view of an example of an auger drive arrangement, as may be used according to an exemplary embodiment.

Referring now also to FIGS. 3-5, the drive arrangement for the auger 116 is described in more detail. FIG. 3 shows the exemplary auger 116 in side view (i.e., looking perpendicular to the forward direction F), and FIGS. 4 and 5 show isometric views of each end of an exemplary embodiment of a header with certain parts removed for clarity. The auger 116 comprises helical blades that push crop material in a certain direction (preferably towards the lateral centerline of the header 110 from each transverse end) as the auger 116 is rotated, such as known in the art. The auger 116 is rotatably mounted to the header frame 110*a* to rotate about an auger rotation axis 116' that extends in the transverse direction T. In FIG. 3, the auger rotation axis 116' extends perpendicular to the page, and so appears as a single point in this illustration.

The auger 116 is operated by a second transmission 130 that is operatively connected between the crop cutter 114 and the auger 116, and defines a second power flow path to drive the auger 116 by operative motion of the crop cutter 114. In this case, the second transmission 130 includes a hydraulic pump 130*a*, a hydraulic motor 130*b*, and hydraulic fluid lines 130*c* (e.g., a high pressure line and a low pressure line) fluidly connecting the hydraulic pump 130*a* to the hydraulic motor 130*b*. The hydraulic pump 130*a* is operatively connected to a second one of the cutting discs 122*b* via a second transmission input 130*d*, such as a drive shaft with universal joints to account for misalignment. The second cutting disc 122*b* preferably is spaced apart from the first cutting disc 122*a* to thereby allow the hydraulic pump 130*a* to be connected in proximity to or directly to the second cutting disc 122*b* without interfering with the first transmission 126. For example, the first cutting disc 122*a* may be located at a first transverse end of the row of cutting discs 122, and the second cutting disc 122*b* may be located at a second transverse end of the row of cutting discs 122, such as shown.

In use, the second transmission input 130*d* is rotated by the second cutting disc 122*b*, to cause the hydraulic pump 130*a* to pump hydraulic fluid through the hydraulic lines 130*c* to the hydraulic motor 130*b*. The moving fluid causes the hydraulic motor 130*b* to generate a motive force at a second transmission output 130*e*. The second transmission output 130*e* may simply comprise an output shaft 130*e'* of the hydraulic motor 130*b*, which may be directly attached to the auger 116. Alternatively, the second transmission output 130*e* may include a series of mechanical components that form portions of the second power flow path. In the shown example, the second transmission output 130*e* includes the hydraulic motor output shaft 130*e'*, a drive gear 130*e''* that is directly connected to the auger 116, and one or more belts or chains 130*e'''* that drivingly connect the drive gear 130*e''* to the output shaft 130*e'*. The arrangement also may include other features conventional to flexible drive trains, such as idler gears 130*e''''*, tensioners, and so on. In other cases, the belts or chains 130*e'''* may be replaced by gears or shafts, or the output shaft 130*e'* may be a gear that directly engages the drive gear 130*e''*.

The second transmission 130 may have a fixed output ratio or a variable output ratio. A fixed output ratio can be provided using a fixed displacement hydraulic pump 130*a*, a fixed displacement hydraulic motor 130*b*, and a single-ratio output drive train. A variable output ratio can be provided, for example, by using a variable speed hydraulic drive mechanism (e.g., a variable displacement hydraulic pump 130*a* or a hydraulic flow control valve) and/or by using a variable speed mechanical transmission, and so on.

Providing the second transmission 130 with a variable output ratio provides the operator with the option to drive the auger 116 at a different speed than the crop cutter 114. For example, the crop cutter 114 may be operated at 2000-2400 rpm, while the auger 116 can be rotated at a range of different speeds depending on the crop conditions.

In some cases, embodiments are expected to provide various benefits. For example, using a first transmission 126 to drive the crop cutter 114, and a second transmission 130 to use the crop cutter 114 to drive the auger 116, allows the first transmission 126 to be a relatively simple and inexpensive mechanical gearbox, and avoids the need to provide a second gearbox or output shaft from the first transmission 126 to drive the auger 116. Also, the second transmission 130 can be secured in a simple and inexpensive way to the crop cutter 114. Using two transmissions also allows the auger 116 to be operated at variable speeds relative to the crop cutter 114, without requiring significantly more complex drive arrangements.

In some embodiments, the arrangement can also be relatively compact. For example, in FIG. 5 it can be seen that a second transmission 130 as described above can be attached to the header 110 in a compact manner. In this case, the hydraulic pump 130*a* is mounted directly in line with the second cutting disc 122*b*, and the hydraulic motor 130*b* is mounted to the frame 110*a* at a location extending inboard from the lateral outer end 110*a*' of the frame 110*a*. The second transmission output 130*e* is located close against the lateral outer end 110*a*' of the frame 110*a*. Thus, the arrangement does not require the header 110 to have any significant additional width or height as compared to a conventional header.

It will be appreciated that other embodiments may be modified in various ways. For example, the second transmission 130 may be a purely mechanical transmission (e.g., an arrangement of drive shafts, gears, pulleys, belts, etc.). Similarly, the first transmission 126 may be a hydraulic motor that is operated by a hydraulic pump. In still other cases, the first transmission 126 may be powered by a power unit located on the header 110, rather than a power unit 104 located on the tractor chassis 102. Also, the disc cutter can be replaced with a sickle bar cutter or other mechanism. Also, the header 110 may be reconfigured as an integral part of the vehicle (i.e., the vehicle is not a general purpose tractor but instead is dedicated to use solely with the header 110) or reconfigured to be a towed machine. Other options and variations of the exemplary structures will be apparent to persons having ordinary skill in the art in view of the present disclosure, and with practice of the constructs and claimed structures described herein.

All numerical values and numerical ranges provided herein, including in the claims, are presented with the understanding that some variation may be present according to typical manufacturing tolerances, operation tolerances, and measurement tolerances, and are intended to have a broad meaning in harmony with the common and accepted usage by those of ordinary skill in the art to which the subject matter of this disclosure pertains. Accordingly, these values should be interpreted as indicating that insubstantial or inconsequential modifications or alterations of the subject matter described and claimed are considered to be within the scope of the disclosure as recited in the appended claims. These principles apply regardless of whether a value is identified as being approximate in one circumstance and specific in another circumstance (e.g., identified with the qualifier "substantially" or the like in one appearance, and identified without the qualifier "substantially" or the like in another circumstance).

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

Except as otherwise made clear by principles of differentiation or specific narrowing language, the terms "coupled," "operatively coupled," and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic or a combination thereof.

The operation and advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. An agricultural machine comprising:

a header frame;

a crop cutter mounted to the frame;

a first transmission operatively connected to the crop cutter and defining a first power flow path to drive the crop cutter by operative motion of a first transmission input;

an auger rotatably mounted to the frame to rotate relative to the frame about a rotation axis; and a second transmission operatively connected between the crop cutter and the auger and defining a second power flow path to drive the auger by operative motion of the crop cutter.

2. The agricultural machine of claim 1, wherein the crop cutter comprises a disc cutter.

3. The agricultural machine of claim 1, wherein the crop cutter comprises a sickle bar cutter.

4. The agricultural machine of claim 1, wherein the first transmission comprises one or more of: a mechanical transmission and a hydraulic transmission.

5. The agricultural machine of claim 1, wherein the second transmission comprises one or more of: a mechanical transmission and a hydraulic transmission.

6. The agricultural machine of claim 1, wherein the first transmission has an input-to-output drive ratio of between 1:2 and 1:2.4.

7. The agricultural machine of claim 1, wherein the second transmission has a variable input-to-output ratio.

8. The agricultural machine of claim 7, wherein the second transmission comprises a variable-speed hydraulic drive.

9. The agricultural machine of claim 1, wherein:

the first transmission comprises a mechanical gearbox including the first transmission input and a first transmission output mechanically connected to the crop cutter at a first location; and the second transmission comprises a hydraulic pump having a second transmission input mechanically connected to the crop cutter at a second location, a hydraulic motor having a second transmission output mechanically connected to the auger, and a hydraulic power flow path interconnecting the hydraulic pump and the hydraulic motor.

10. The agricultural machine of claim 9, wherein the second transmission output is mechanically connected to the auger by one or more drive belts or drive chains.

11. The agricultural machine of claim 9, wherein:

the crop cutter comprises a disc cutter comprising a plurality of cutting discs configured to rotate about respective rotation axes;

the first transmission output is mechanically connected to a first one of the plurality of cutting discs; and the second transmission input is mechanically connected to a second one of the plurality of cutting discs.

12. The agricultural machine of claim 11, wherein:

the plurality of cutting discs are arranged in a row extending transverse to a forward operating direction of the frame from a first end of the row to a second end of the row;

the first one of the plurality of cutting discs is located at the first end of the row; and the second one of the plurality of cutting discs is located at the second end of the row.

13. The agricultural machine of claim 1, further comprising a tractor having a chassis, wheels supporting the chassis to move on a ground surface in a forward drive direction, and a main power unit mounted on the chassis, and wherein:

the frame is mounted to the chassis; and the main power unit is operatively connected to drive the first transmission input.

14. The agricultural machine of claim 13, wherein the header is mounted to the chassis at a forward end of the chassis with respect to the forward drive direction.

15. The agricultural machine of claim 1, wherein the first transmission comprises an entirely mechanical transmission, and the second transmission comprises a hydraulic transmission component and a mechanical transmission component.

16. A method of operating an agricultural machine having a crop cutter and an auger, the method comprising:

driving the crop cutter via a first transmission connected to the crop cutter at a first location to operate the crop cutter at a first rotating speed; and driving the auger via a second transmission operatively connected between the crop cutter and the auger at a second location to operate the crop cutter at a second rotating speed.

17. The method of claim 16, wherein the second rotating speed is variable.

18. The method of claim 16, wherein the crop cutter comprises a disc cutter or a sickle bar cutter.

19. The method of claim 16, wherein the first transmission comprises an entirely mechanical transmission.

20. The method of claim 16, wherein the second transmission comprises a hydraulic transmission component and a mechanical transmission component.

* * * * *